US012143452B2

(12) United States Patent
He et al.

(10) Patent No.: US 12,143,452 B2
(45) Date of Patent: Nov. 12, 2024

(54) METHOD AND APPARATUS FOR SIGNALING SESSION TERMINATIONS IN A COMMUNICATION NETWORK

(71) Applicant: Telefonaktiebolaget LM Ericsson (publ), Stockholm (SE)

(72) Inventors: Yingjiao He, Shanghai (CN); Anders P. Larsson, Mölndal (SE); Zhansheng Wei, Shanghai (CN); Robert Törnkvist, Karlskrona (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 352 days.

(21) Appl. No.: 17/786,299

(22) PCT Filed: Dec. 19, 2019

(86) PCT No.: PCT/SE2019/051318
§ 371 (c)(1),
(2) Date: Jun. 16, 2022

(87) PCT Pub. No.: WO2021/126029
PCT Pub. Date: Jun. 24, 2021

(65) Prior Publication Data
US 2023/0021904 A1    Jan. 26, 2023

(51) Int. Cl.
*H04L 67/143* (2022.01)
*H04L 41/0677* (2022.01)
*H04W 92/24* (2009.01)

(52) U.S. Cl.
CPC ........ *H04L 67/143* (2013.01); *H04L 41/0677* (2013.01); *H04W 92/24* (2013.01)

(58) Field of Classification Search
CPC ............... H04L 67/143; H04L 41/0677; H04L 12/1407; H04L 69/40; H04W 92/24;
(Continued)

(56) References Cited

U.S. PATENT DOCUMENTS

2006/0168303 A1\* 7/2006 Oyama ................. H04L 65/104
725/135
2010/0037085 A1    2/2010 Qiang et al.
(Continued)

FOREIGN PATENT DOCUMENTS

WO    2011095256 A1    8/2011
WO    2011098155 A1    8/2011
WO    2018230778 A1    12/2018

OTHER PUBLICATIONS

"3rd Generation Partnership Project; Technical Specification Group Core Network and Terminals; 5G System; Policy and Charging Control signalling flows and QoS parameter mapping; Stage 3 (Release 16)", 3GPP TS 29.513 V16.1.0, Sep. 2019, 94 pages.
(Continued)

*Primary Examiner* — Huy C Ho
(74) *Attorney, Agent, or Firm* — Murphy, Bilak & Homiller, PLLC

(57) ABSTRACT

Protocol Data Unit (PDU) sessions in a communication network (10) provide logical interconnections between Data Networks (DNs) (16) and respective User Equipments (UEs) (12) that access the DNs (16) via the communication network (10), and the communication network (10) establishes one or more affiliated sessions in conjunction with each PDU session, such as an affiliated charging or policy control session. Rather than requiring the high signaling overhead associated with mass terminations of these affiliated sessions on a per session basis, the Network Functions (NFs) (32, 34, 36) contemplated herein provide for batch termination of a potentially large plurality affiliated sessions, based on the exchange of a corresponding batch termination message. Disclosed batch termination techniques include the
(Continued)

exchange of information during session establishment, for later determination of which affiliated sessions are subject to batch termination.

16 Claims, 6 Drawing Sheets

(58) Field of Classification Search
CPC ..... H04W 88/14; H04W 76/19; H04W 76/32; H04M 15/66; H04M 15/8038
USPC ........................................................ 455/424
See application file for complete search history.

(56) References Cited

U.S. PATENT DOCUMENTS

| | | | |
|---|---|---|---|
| 2015/0244874 | A1 | 8/2015 | Trnkvist et al. |
| 2018/0199398 | A1 | 7/2018 | Dao et al. |
| 2019/0166647 | A1 | 5/2019 | Velev et al. |
| 2019/0199802 | A1 | 6/2019 | Zhu et al. |
| 2019/0261260 | A1 | 8/2019 | Dao et al. |
| 2019/0357301 | A1* | 11/2019 | Li .......................... H04M 15/66 |
| 2020/0351980 | A1* | 11/2020 | Talebi Fard .......... H04W 76/40 |

OTHER PUBLICATIONS

"3rd Generation Partnership Project; Technical Specification Group Core Network and Terminals; 5G System; Restoration Procedures (Release 16) The present", 3GPP TS 23.527 V16.1.0, Sep. 2019, 19 pages.

"3rd Generation Partnership Project; Technical Specification Group Core Network and Terminals; Interface between the Control Plane and the User Plane Nodes; Stage 3 (Release 15) The present", 3GPP TS 29.244 V15.7.0, Sep. 2019, 198 pages.

"3rd Generation Partnership Project; Technical Specification Group Core Network and Terminals; Restoration procedures (Release 15)", 3GPP TS 23.007 V15.4.0, Sep. 2019, 107 pages.

"3rd Generation Partnership Project; Technical Specification Group Services and System Aspects; Architecture enhancements for control and user plane separation of EPC nodes; Stage 2 (Release 15) The present", 3GPP TS 23.214 V15.5.0, Dec. 2018, 92 pages.

"3rd Generation Partnership Project; Technical Specification Group Services and System Aspects; Policy and Charging Control Framework for the 5G System (5GS); Stage 2 (Release 15)", 3GPP TS 23.503 V15.7.0, Sep. 2019, 78 pages.

"3rd Generation Partnership Project; Technical Specification Group Services and System Aspects; Procedures for the 5G System (5GS); Stage 2 (Release 15)", 3GPP TS 23.502 V15.7.0, Sep. 2019, 357 pages.

"3rd Generation Partnership Project; Technical Specification Group Services and System Aspects; System Architecture for the 5G System (5GS); Stage 2 (Release 15)", 3GPP TS 23.501 V15.7.0, Sep. 2019, 243 pages.

"3rd Generation Partnership Project; Technical Specification Group Services and System Aspects; System Architecture for the 5G System (5GS); Stage 2 (Release 16) The present", 3GPP TS 23.501 V16.2.0, Sep. 2019, 391 pages.

"3rd Generation Partnership Project; Technical Specification Group Services and System Aspects; Telecommunication management; Charging management; 5G system, charging service; Stage 3 (Release 16)", 3GPP TS 32.291 V16.1.0, Sep. 2019, 102 pages.

"3rd Generation Partnership Project; Technical Specification Group Services and System Aspects; Telecommunication management; Charging management; 5G system, charging service; Stage 3 (Release 15) The present", 3GPP TS 32.291 V15.4.0, Sep. 2019, 78 pages.

"3rd Generation Partnership Project; Technical Specification Group Services and System Aspects; Telecommunication management; Charging management; Charging architecture and principles (Release 16)", 3GPP TS 32.240 V16.0.0, Mar. 2019, 61 pages.

* cited by examiner

METHOD AND APPARATUS FOR SIGNALING SESSION TERMINATIONS IN A COMMUNICATION NETWORK

TECHNICAL FIELD

The present invention relates to signaling session terminations in a communication network.

BACKGROUND

Providing communication services via a communication network, such as a Public Land Mobile Network (PLMN), involves many operations, including the routing and handling of user traffic, the authentication and authorization of the user devices that connect to the network and consume communication services, the management of the logical and physical connections used to couple the user devices to the network, and the various affiliated operations, including charging, policy control, etc. A variety of "network functions" (NFs) support such operations, where a given NF can be understood as a computer server or other processing node that is communicatively interconnected within the network and configured to provide certain functions in support of the overall operation of the communication network. In some network types, NFs may be broadly divided, for example, in terms of whether they support User Plane (UP) operations or Control Plan (CP) operations.

More than one NF may be implemented within a given physical node, and NF functions may be virtualized, e.g., using cloud-computing resources offered by a data center. Nonetheless, a NF is a physical entity in the sense that it represents processing and communication-interface circuitry, dedicated or otherwise, that is configured to provide a specific function or functions, in the context of overall operation of the involved communication network.

For example details regarding one approach to defining NFs to support the various UP and CP operations needed to connect with, manage, and provide communication services to user devices—also referred to as "User Equipments" or "UEs"—via a PLMN, see the Third Generation Partnership Project (3GPP) Technical Specification (TS) 23.501 V16.2.0 (2019 Sep. 24). TS 23.501 sets out system architecture details for Fifth Generation (5G) wireless communication networks.

In the 5G context and in other contexts, "session management" represents a key NF. Protocol Data Unit (PDU) sessions in a communication network provide logical interconnections between Data Networks (DNs) and respective UEs that access the DNs via the communication network. The communication network establishes one or more "affiliated" sessions in conjunction with each PDU session, such as an affiliated charging or policy control session. Here and elsewhere in this disclosure, the use of "or" denotes the inclusive case of either or both items, i.e., "and/or."

For example, in the context of establishing a PDU session, a "Session Management Function" (SMF) in the communication network sends signaling to one or more further NFs, to establish affiliated sessions. Each PDU session managed by the SMF may have one or more corresponding affiliated sessions, such as an affiliated charging session managed by a Charging Function (CHF) in the network or an affiliated policy control session managed by a Policy Control Function (PCF) in the network.

Further specific functions in the network support each PDU session, such as NFs that provide access control and/or mobility management for handling movement of the UE among or between different cells, beams, or other coverage-area divisions used by the communication network in question. Such a NF may be referred to as an Access and Mobility Management Function (AMF). Further NFs used to support individual PDU sessions include user-plane functions or UPFs. For a given UE having a PDU session involving a Data Network (DN) accessed via the communication network, a UPF provides data-forwarding functionality as between the UE and the DN.

Although a communication network may include multiple SMFs, the burgeoning use of data services by Internet-of-Things (IoT) devices, Machine Type Communication (MTC) devices, Ultra Low Latency Communication (ULCC) devices, Mobile Broadband (MBB) devices, etc., means that a given SMF can be expected to manage many thousands of PDU sessions, or more, at any given time. Certain types of network events may result in the termination of a large number of the PDU sessions being supported by a given SMF, such as the failure or restarting of another NF being used to support those PDU sessions, or the failure of a link in the data or control paths associated with them.

The SMF must then initiate termination of the affiliated sessions it established in correspondence with individual ones of the PDU sessions. One aspect recognized herein is that existing approaches to session termination are inefficient and impose potentially high signaling overhead within the network.

SUMMARY

Protocol Data Unit (PDU) sessions in a communication network provide logical interconnections between Data Networks (DNs) and respective User Equipments (UEs) that access the DNs via the communication network, and the communication network establishes one or more affiliated sessions in conjunction with each PDU session, such as an affiliated charging or policy control session. Rather than requiring the high signaling overhead associated with mass terminations of these affiliated sessions on a per session basis, the Network Functions (NFs) contemplated herein provide for batch termination of a potentially large plurality of affiliated sessions, based on the exchange of a corresponding batch termination message. Disclosed batch termination techniques include the exchange of information during session establishment, for later determination of which affiliated sessions are subject to batch termination.

An example method of operation by a Session Management Function (SMF) in a communication network includes the SMF detecting a network event that is external to the SMF and triggers termination of a plurality of PDU sessions managed by the SMF. The plurality of PDU sessions has a corresponding plurality of affiliated sessions in the communication network associated with charging or policy control, and the SMF identifies a batch of affiliated sessions that is subject to a batch termination rather than individual per session terminations, among the corresponding plurality of affiliated sessions. Correspondingly, the method includes the SMF initiating the batch termination by generating a batch notification message that identifies which part of the communication network experienced the network event, and sending the batch notification message towards a further Network Function (NF) that supports the batch of affiliated sessions, in lieu of sending individual notification messages for the affiliated sessions in the batch of affiliated sessions.

A SMF configured for use in a communication network comprises, for example, communication interface circuitry configured for communicatively coupling the SMF to other NFs in the communication network. The example SMF further comprises processing circuitry operatively associated with the communication interface circuitry and configured to detect a network event that is external to the SMF and triggers termination of a PDU sessions managed by the SMF. The plurality of PDU sessions has a corresponding plurality of affiliated sessions in the communication network associated with charging or policy control, and the processing circuitry of the SMF is configured to identify a batch of affiliated sessions that is subject to a batch termination rather than individual per session terminations, among the corresponding plurality of affiliated sessions and initiate the batch termination. Initiation includes generating a batch notification message that identifies which part of the communication network experienced the network event and sending the batch notification message towards a further NF that supports the batch of affiliated sessions, in lieu of sending individual notification messages for the affiliated sessions in the batch of affiliated sessions.

A method of operation by a NF for charging or policy control in a communication network complements the above-described features and operations for session management by a SMF. In an example, the method includes the NF receiving a batch notification message from the SMF to initiate a batch termination by the NF of certain affiliated sessions managed by the NF. In this context, the NF manages a plurality of affiliated sessions, each affiliated session corresponding to a PDU session managed by the SMF and being an affiliated charging or policy control session. Further, the method includes the NF determining from information included in the batch notification message which part of the communication network experienced a network event that triggered the SMF to send the batch notification message. The NF uses that information and information provided to the NF during session establishment of each of the affiliated sessions, to identify the certain affiliated sessions subject to batch termination responsive to the batch termination message. The certain affiliated sessions are any affiliated session from among the plurality of affiliated sessions that have session establishment information indicating that the affiliated session is eligible for batch termination and corresponds to a PDU session supported by the part of the communication network that experienced the network event. The method includes the NF terminating each of the certain affiliated sessions.

A NF configured for charging or policy control in a communication network includes, for example, communication interface circuitry configured to receive a batch notification message from a SMF to initiate a batch termination by the NF of certain affiliated sessions managed by the NF. In this context, the NF manages a plurality of affiliated sessions, each affiliated session corresponding to a PDU session managed by the SMF and being an affiliated charging or policy control session. Processing circuitry included in the NF and operatively associated with the communication interface circuitry is configured to determine from information included in the batch notification message which part of the communication network experienced a network event that triggered the SMF to send the batch notification message. The processing circuitry uses such information, and session-establishment information received from the SMF when establishing each of the affiliated sessions to identify certain affiliated sessions as being covered by the batch termination message. The certain affiliated sessions are identified as any affiliated session from among the plurality of affiliated sessions that have session establishment information indicating that the affiliated session is eligible for batch termination and corresponds to a PDU session supported by the part of the communication network that experienced the network event. Correspondingly, the processing circuitry is configured to terminate each of the certain affiliated sessions.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
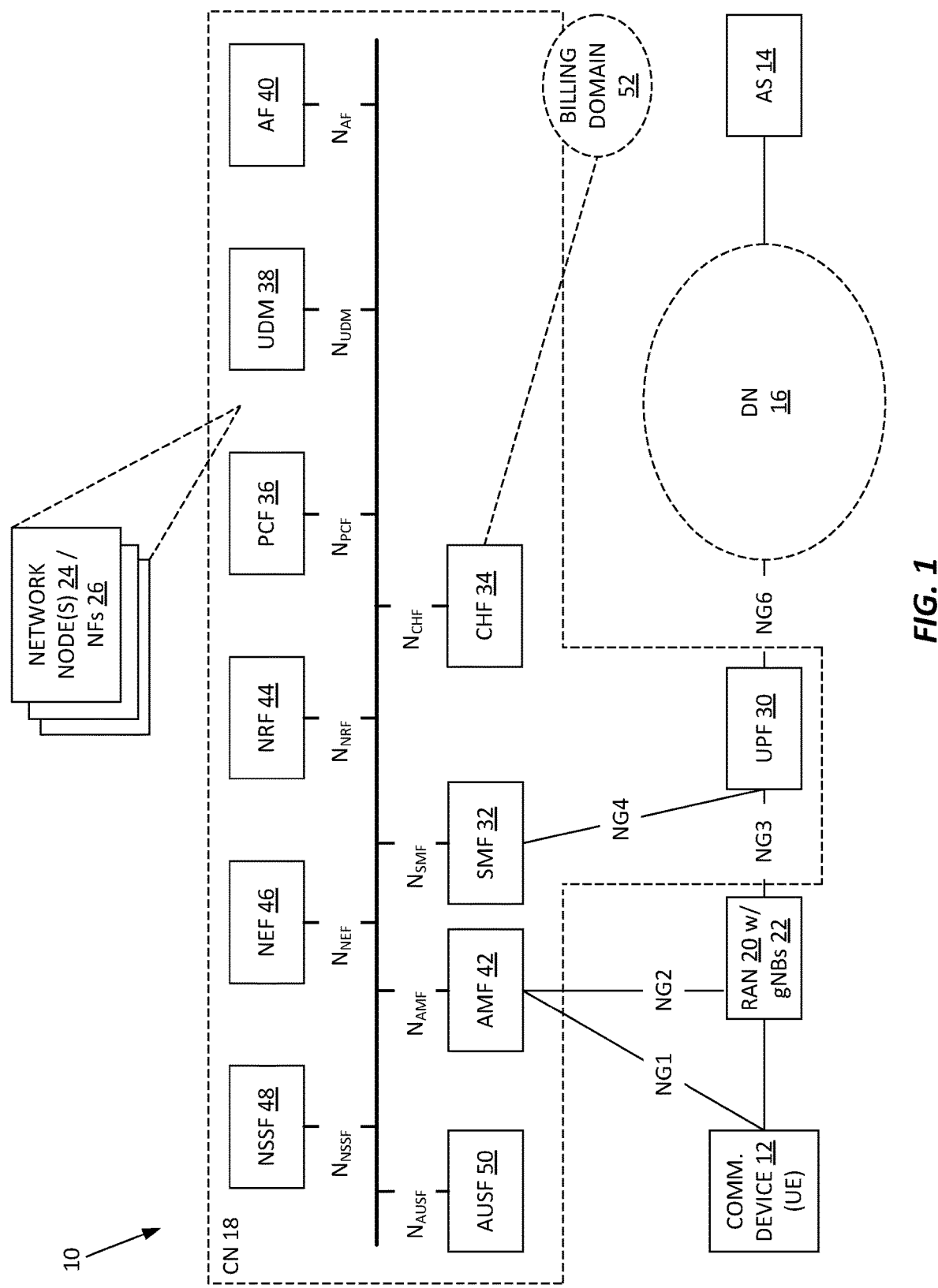
FIG. 1 is a block diagram of one embodiment of a communication network.

FIG. 1 illustrates an example communication network 10 that is operative to provide one or more communication services to communication devices 12, also referred to as "User Equipments" or "UEs" 12. A UE 12 includes or is associated with subscription credentials or is otherwise authorized to access the communication network 10. In an example use case, a UE 12 uses the communication network 10 as an "access network" for communicatively coupling to a remote Application Server (AS) 14 that is included in or is otherwise accessible via a Data Network (DN) 16 to which the communication network 10 is coupled. The DN 16 may be identified by a Data Network Name (DNN) and may offer a particular communication service or type of communication service.

Example parts of the communication network 10 include a Core Network (CN) 18 and a Radio Access Network (RAN) 20, which includes a number of radio access points, denoted here as "gNBs" 22. The term "gNB" denotes a radio base station in the terminology adopted for Fifth Generation (5G) communication networks, and other node/function names depicted in FIG. 1 also follow the 5G naming conventions. While the 5G context represents an advantageous implementation in at least some scenarios, the techniques disclosed herein are not limited to the 5G specifications and architecture and, instead, have applicability to any communication network that involves session terminations relevant to the disclosed techniques.

Although only one UE 12 appears in FIG. 1 for ease of discussion, there may be many UEs 12 supported by the communication network 10—"network 10" hereafter. A UE 12 is essentially any type of communication apparatus configured to use the network 10 for accessing communication services, e.g., any device, terminal, or other apparatus having the requisite radio transceiver circuitry, and processing circuitry implementing the requisite communication or protocol stacks. UEs 12 may be intended for human use, e.g., for consumption of multimedia or other electronic content, or may be intended for machine-to-machine (M2M) operations. Of course, the network 10 may support many UEs 12 at any given time, of many different types and having significantly different capabilities.

Further, the RAN 20 may have multiple gNBs 22—"radio access points 22" hereafter. Indeed, the CN 18 may be associated with more than one RAN 20 and different RANs 20 may use different Radio Access Technologies (RATs). The radio access point(s) 22 provide coverage in one or any combination of "cells," "sectors," and "beams." A given cell, sector, or beam represents the allocation of particular radio resources at a particular time and for a particular geographic coverage area. Allocations may be static, semi-static, or dynamically determined, and may involve any one or more of code-domain, frequency-domain, time-domain, or spatial-domain resource allocations.

Various Network Functions (NFs) 26 implemented in the CN 18 carry out the multiple operations executed by the network 10 in providing communication services to the UEs 12, with these various NFs 26 being instantiated, implemented, or otherwise realized in one or more network nodes 24. A computer server with data networking or other communication interface circuitry represents one example of a network node 24. More than one NF 26 may be implemented in a given network node 24 and multiple copies or instantiations of a given NF 26 may exist at a given network node 24. Further, at least some of the network nodes 24 may be cloud-computing resources, e.g., virtualized processing systems instantiated on underlying data-center servers or other processing apparatus. While specific NFs 26 or specific types of NFs are given separate reference numbers later herein, for ease of discussion, the reference number "24" refers to any given network node implementing any given NF 26.

See the Third Generation Partnership Project (3GPP) Technical Specification (TS) 23.501 V16.2.0 (2019 Sep. 24), setting out system architecture details for Fifth Generation (5G) wireless communication networks. Following that context as a non-limiting example, the depicted CN 18 includes: a User Plane Function (UPF) 30, a Session Management Function (SMF) 32, a Charging Function (CHF) 34, a Policy Control Function (PCF) 36, a Unified Data Management Function (UDM) 38, an Application Function (AF) 40, an Access and Mobility Management Function (AMF) 42, a Network Repository Function (NRF) 44, a Network Exposure Function (NEF) 46, a Network Slice Selection Function (NSSF) 48, and an Authentication Server Function (AUSF) 50. Also depicted is a billing domain 52 which operates in association with signaling exchanged with the CHF 34.

While FIG. 1 depicts individual instances or implementations of the various NFs 26, there may be multiple instances of any given one of the NFs 26 in the CN 18. For example, the CN 18 may include more than one SMF 32, more than one CHF 34, more than one PCF 36, and/or more than one AMF 42. Session-related interactions between a given SMF 32 and one or more given further NFs 26 is of particular interest herein, such as session-related interactions between the given SMF 32 and one or more CHFs 34 and/or PCFs 36, individually or jointly referred to as a "further NF 34 or 36". Various ones of the NFs 26 depicted in the CN 18 are not germane to understanding the techniques disclosed herein and, correspondingly, this disclosure does not elaborate the details of their respective functionality.

Figure 2:
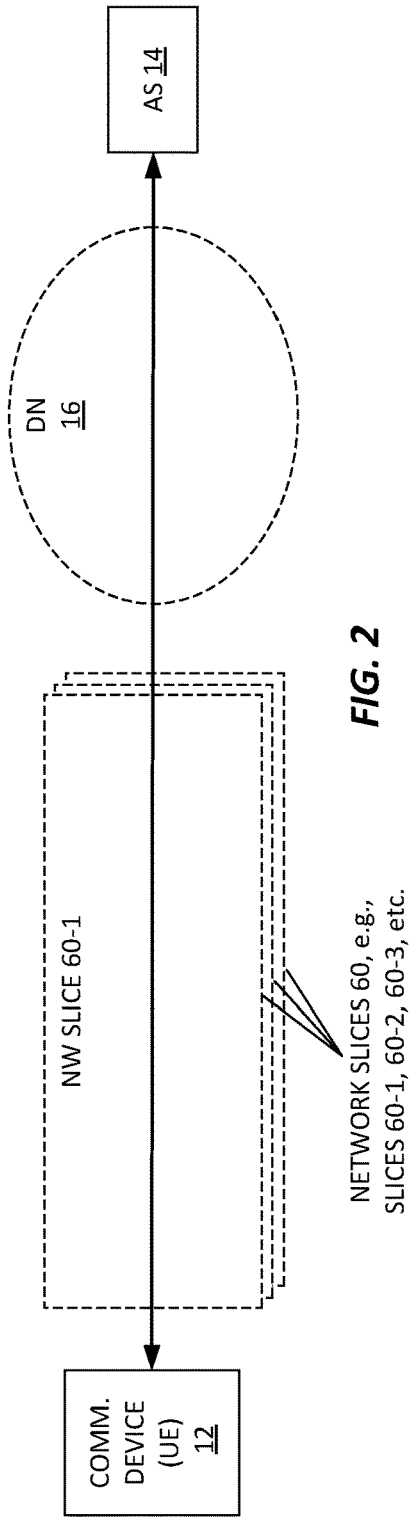
FIG. 2 is a block diagram of one embodiment of network slicing, as might be applied to the communication network introduced in FIG. 1.

FIG. 2 illustrates that the network 10 may be organized as or otherwise provide multiple network slices 60. For example, the network 10 includes network slices 60-1, 60-2, 60-3, etc. Each network slice 60 comprises an allocation of underlying network infrastructure and can be understood as a software-defined network or network partition that is distinct from the other defined network slices 60. Different network slices 60 may be used for different types of communication services, or to satisfy different quality requirements, such as might be specified in a Service Level Agreement (SLA) between an operator of the network 10 and an owner of a deployment of UEs 12 that make use of the network 10 for one or more types of communication services. Slicing may be dynamic, static, or semi-static. Complex details associated with network slicing are not necessary to understand the techniques disclosed herein, and it is sufficient to understand that any number of UEs 12 may be connected through a particular slice 60 of the network 10, meaning that certain types of "network events" affecting a network slice 60 may trigger termination of the PDU sessions supported by the network slice 60.

Here, the term "network event" denotes an occurrence of something within the network 10 that disrupts PDU sessions. For example, within the CN 18 there are particular NFs 26 that are in the control or data paths associated with an ongoing PDU session and any failure or restart at one or more of those particular NFs 26 causes termination of the ongoing PDU session, and the same holds for any "link" failures associated with the control or data connections to or from the particular NFs 26.

As an example, with reference to FIGS. 1 and 2, a given UE 12 has an ongoing PDU session that is carried by a particular network slice 60 and managed by the depicted SMF 32 and supported by the depicted UPF 30 and AMF 42. Any failure or restart by any of these NFs 26 or any failure of the interconnections used by the respective supporting NFs 26 causes termination of the UE's PDU session. Assuming that the SMF 32 is not the NF 26 that experienced the network event, the SMF 32 responds to the PDU session termination by initiating termination of one or more corresponding affiliated sessions. For example, in conjunction with establishing the PDU session, the SMF 32 may have initiated establishment of an affiliated charging session at the CHF 34 and an affiliated policy control session at the PCF 36. Responsive to termination of the PDU session as a consequence of the network event, the SMF 32 initiates termination of the affiliated session or sessions.

Of course, the SMF 32 at any given time may support a large number of PDU sessions and the techniques herein provide significant efficiency gains through "batch termination" operations that represent a significant departure from conventional practice according to which the SMF 32 conducts per-session terminations of affiliated sessions.

Figure 3:
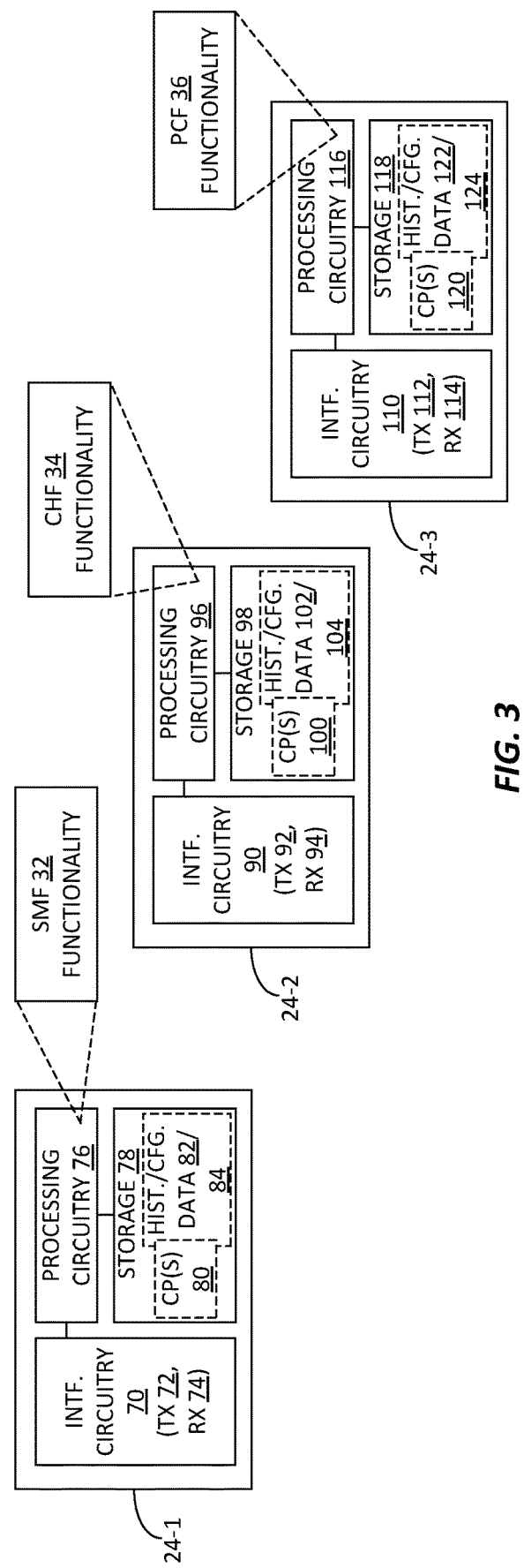
FIG. 3 is a block diagram of example implementations of certain Network Functions (NFs) used in a communication network, such as the communication network introduced in FIG. 1, including a Session Management Function (SMF), a Charging Function (CHF), and a Policy Control Function (PCF).

FIG. 3 illustrates an example network node 24-1 that is operative as a SMF 32, such that the SMF 32 can be understood as comprising communication interface circuitry 70, along with associated processing circuitry 76 and storage 78. The communication interface circuitry 70 comprises, for example, transmitter circuitry 72 and receiver circuitry 74. As an example, the communication interface circuitry 70 comprises bus interface circuitry within a server rack or assembly, or comprises a data networking interface, such as an ethernet interface. More generally, the communication interface circuitry 70 comprises physical-layer interface circuits for sending and receiving signaling in wired or wireless mediums, along with communication control and protocol processing circuitry for exchanging messages or other signaling with one or more other entities in the network 10.

The processing circuitry 76 comprises dedicated circuitry or programmed circuitry or some combination of dedicated circuitry and programmed circuitry. In either case, the processing circuitry 76 is specially adapted to carry out the SMF-related aspects of the techniques disclosed herein. In at least one example, the processing circuitry 76 comprises one or more microprocessors, digital signal processors, FPGAs, ASICs, systems-on-a-chip (SoCs), or other logical processing circuits.

Correspondingly, in at least one such example, the processing circuitry 76 is realized based on logical processing circuits executing computer program instructions of one or more computer programs (CPs) 80 stored in the storage 78. Correspondingly, the storage 78 comprises one or more types of computer-readable media, such as one or more types of memory circuits and/or one or more types of disk storage. Example media include working memory for program execution and data manipulation, such as RAM, and nonvolatile memory or storage such as flash or solid-state disk, for longer term storage. It will be appreciated that the word "stores" connotes retention of some persistence (non-transitory storage), although not necessarily permanent storage.

The storage 78 in one or more embodiments also stores historical data 82 and/or configuration data 84, which may be used as input or control information for processing by the processing circuitry 76. Of course, at least a portion of the storage 78 may be resident or on-board with the processing circuitry 76, such as program instruction registers or low-level cache memory.

With these implementation details in mind, a SMF 32 in one or more embodiments comprises communication interface circuitry 70 configured for communicatively coupling the SMF 32 to other NFs 26 in the network 10. Further, the SMF 32 includes processing circuitry 76 that is operatively associated with the communication interface circuitry 70 and configured to detect a network event that is external to the SMF 32 and triggers termination of a plurality of PDU sessions managed by the SMF 32. The plurality of PDU sessions has a corresponding plurality of affiliated sessions in the network 10 associated with charging or policy control. For example, each PDU session managed by the SMF 32 has an affiliated charging session managed by a CHF 34 in the network 10 or an affiliated policy control session managed by a PCF 36 in the network 10.

The processing circuitry 76 of the SMF 32 is further configured to identify a batch of affiliated sessions that is subject to a batch termination rather than individual per session terminations, among the corresponding plurality of affiliated sessions, and initiate the batch termination. To initiate the batch termination, the processing circuitry 76 is configured to generate a batch notification message that identifies which part of the network 10 experienced the network event, and send the batch notification message towards a further NF 34 or 36 that supports the batch of affiliated sessions, in lieu of sending individual notification messages for the affiliated sessions in the batch of affiliated sessions.

For example, in one or more embodiments or in at least some instances, the network event is a service or path failure affecting the plurality of PDU sessions, and the batch notification message identifies the service or path failure. As a particular example, the network event is a NF failure or a NF restart affecting the plurality of PDU sessions, and the batch notification message identifies the NF 26 that failed or restarted.

The batch notification message identifies at least one of: a Data Network Name (DNN) of DN 16 involved in the network event, or a network slice 60 involved in the network event, a NF 26 involved in the network event. Further, the batch notification message may include a timestamp for the network event and a total volume (of service consumption) used up to the network event, e.g., service consumption for which pending reporting or accounting did not occur because of the network event. Such batch-termination information is for use by the further NF 34 or 36 in identifying which affiliated sessions in the corresponding plurality of affiliated sessions are affected by the network event and, therefore, belong to the batch of affiliated sessions. To say that an entity is "involved" in the network event means that the entity experienced the network event or is in a data or control path of a PDU session terminated or being terminated as a consequence of the network event.

In at least one embodiment, processing circuitry 76 is configured to identify a batch of affiliated sessions that is subject to the batch termination on an indirect basis. For example, the SMF 32 identifies which affiliated sessions are supported by the further NF 34 or 36, and, from among the identified affiliated sessions, further identifies, as eligible affiliated sessions, which identified affiliated sessions are eligible for batch termination. In this sense, identification by the processing circuitry 76 of a batch of affiliated sessions that is subject to batch termination may be as simple as the processing circuitry 76 remembering from session-establishment signaling that at least a subset of the current PDU sessions managed by the SMF 32 have affiliated sessions at a further NF 34 or 36 for which the further NF 34 or 36 supports batch termination, and determining that batch termination of the corresponding affiliated sessions is appropriate for at least some of the PDU sessions in that subset—e.g., the communication service type or billing or policy parameters applicable to such PDU sessions means that batch termination of the corresponding affiliated sessions is appropriate.

In a working example, assume that the SMF 32 currently manages a plurality of PDU sessions and that a network event triggers termination of them. From among the plurality of PDU sessions terminated or being terminated, a first subset has corresponding affiliated sessions at a first CHF 34, denoted here as 34-1 for clarity, a second subset has corresponding affiliated charging sessions at a second CHF 34, denoted here as 34-2 for clarity, and a remaining third subset has corresponding affiliated charging sessions at a third CHF 34, denoted here as 34-3 for clarity. Further, assume that the CHFs 34-1 and 34-2 do not support batch termination and that the CHF 34-3 supports batch termination. As will be explained in more detail, the SMF 32 knows whether batch termination is supported based on signaling exchanged with the CHF 34 during establishment of the affiliated sessions.

Because the CHF 34-1 and 34-2 do not support batch termination, the SMF 32 undertakes per-session termination actions regarding the affiliated sessions at the CHF 34-1 and 34-2. However, because the CHF 34-3 supports batch termination, the affiliated sessions supported by it are at least candidates for batch termination. To determine whether any of these candidate affiliated sessions can be batch-terminated, the SMF 32 evaluates the respectively corresponding PDU sessions, such as by assessing charging or policy-control parameters associated with those PDU sessions, to determine which ones of the candidate affiliated sessions can be batch-terminated at the CHF 34-3. Similar logic applies for other types of affiliated sessions, such as affiliated policy-control sessions established at one or more PCFs 36, in correspondence with the PDU sessions being managed by the SMF 32.

In at least one embodiment, the processing circuitry of the SMF 32 is configured to identify the batch of affiliated sessions that is subject to the batch termination by, from among the corresponding plurality of affiliated sessions, identifying, as identified affiliated sessions, which affiliated sessions are supported by the further NF 34 or 36, and, from among the identified affiliated sessions, further identifying, as eligible affiliated sessions, which identified affiliated sessions are eligible for batch termination. In an example implementation, provided that the further NF 34 or 36 supports batch terminations, any given one among the identified affiliated sessions is eligible for batch termination in dependence on whether the corresponding PDU session is associated with a non-metered or non-roaming user of the communication network, i.e., eligible, or is associated with a metered or roaming user of the communication network, i.e., not eligible.

To determine whether a given further NF 34 or 36 supports batch termination of affiliated sessions, in one or more embodiments, the processing circuitry 76 is configured to receive an indication of support in session-establishment signaling returned from the further NF 34 or 36, in association with the SMF 32 establishing individual ones among the batch of affiliated sessions at the further NF 34 or 36. That is, in conjunction with a new PDU session being established, the SMF 32 may initiate the establishment of one or more affiliated sessions, e.g., an affiliated charging session at a CHF 34 or an affiliated policy-control session at a PCF 36, and may receive return signaling indicating that the CHF 34 or the PCF 36 supports batch termination.

Of course, because a batch termination message sent from the SMF 32 in at least one embodiment does not directly identify the affiliated sessions to be terminated by the further NF 34 or 36, the further NF 34 or 36 must have some basis for identifying which ones of the affiliated sessions that it currently supports are subject to batch termination in response to the batch termination message. That is, the further NF 34 or 36 may support affiliated sessions for a given SMF 32, where only certain ones of the affiliated sessions are subject to batch termination.

In one or more embodiments, for establishing individual affiliated sessions at a further NF 34 or 36, the processing circuitry 76 of the SMF is configured to provide the further NF 34 or 36 with identification information enabling batch termination operations at the further NF 34 or 36. The identification information comprises one or more NF identifiers identifying one or more NFs 26 in the network 10 that are used to support the corresponding PDU sessions. Thus, the further NF 34 or 36 can logically link each of its affiliated sessions to the particular NFs 26 in the network 10 that support the corresponding PDU session. Then, when the incoming batch termination message includes the NF identifier(s) of the NFs 26 that was/were involved in the network event that triggered the PDU terminations, the further NF 34 or 36 can identify the affiliated sessions to be batch terminated by determining which affiliated sessions correspond to PDU sessions that are supported by an NF 26 involved in the network event.

More broadly, each PDU session managed by the SMF 32 will be understood as having one or more network entities external to the SMF 32 that are "associated" with it. The processing circuitry 76 of the SMF 32 in one or more embodiments is configured to send identifiers for the one or more of the associated network entities, in the session-establishment signaling sent to the further NF 34 or 36, for establishment of the corresponding affiliated session. The further NF 34 or 36 in such embodiments logs or records the identifier(s) as being associated with the corresponding affiliated session. A batch termination message subsequently incoming to the further NF 34 or 36 from the SMF 32 carries identifiers for one or more of the network entities involved in the network event—i.e., the network entities that experienced the failure or restart or were on an affected control or data path supporting the PDU session. Thus, the further NF 34 or 36 identifies which ones of its affiliated sessions are subject to termination under the batch termination message by determining which ones have an associated identifier or identifiers that match the identifier or identifiers conveyed in the batch termination message.

Although the further NF 34 or 36 may have to terminate the batch of affiliated sessions internally on a per-session basis, the termination is performed at a batch level from the perspective of the SMF 32, because it needed to send only one message—i.e., the batch termination message—to trigger the termination of multiple affiliated sessions at the further NF 34 or 36. However, the SMF 32 is operative to perform per-session terminations, too, for affiliated sessions that are not eligible for batch termination. For affiliated sessions among the plurality of affiliated sessions that are not subject to batch termination, the processing circuitry 76 of the SMF 32 in at least one embodiment is configured to initiate session termination on an individual per session basis by sending an individual notification message for each such affiliated session.

In the same embodiment(s) or in a further embodiment, the processing circuitry 76 of the SMF 32 is configured to determine a service consumption measure representing unreported service consumption associated with a batch of affiliated sessions to be batch terminated, and includes the service consumption measure in the corresponding batch notification message sent from the SMF 32. The service consumption measure is reported as an aggregated consumption, or on a per network-slice or per Data Network Name (DNN) basis, and it represents communication service consumption that is unaccounted for as a consequence of the corresponding PDU sessions being terminated because of the network event. In the same or in other embodiments, the processing circuitry 76 of the SMF 32 is configured to include a timestamp in the batch notification message, indicating an event time for the network event. The timestamp information enables further downstream operations, such as accounting reconciliations or network diagnostics.

Figures 4, 5:
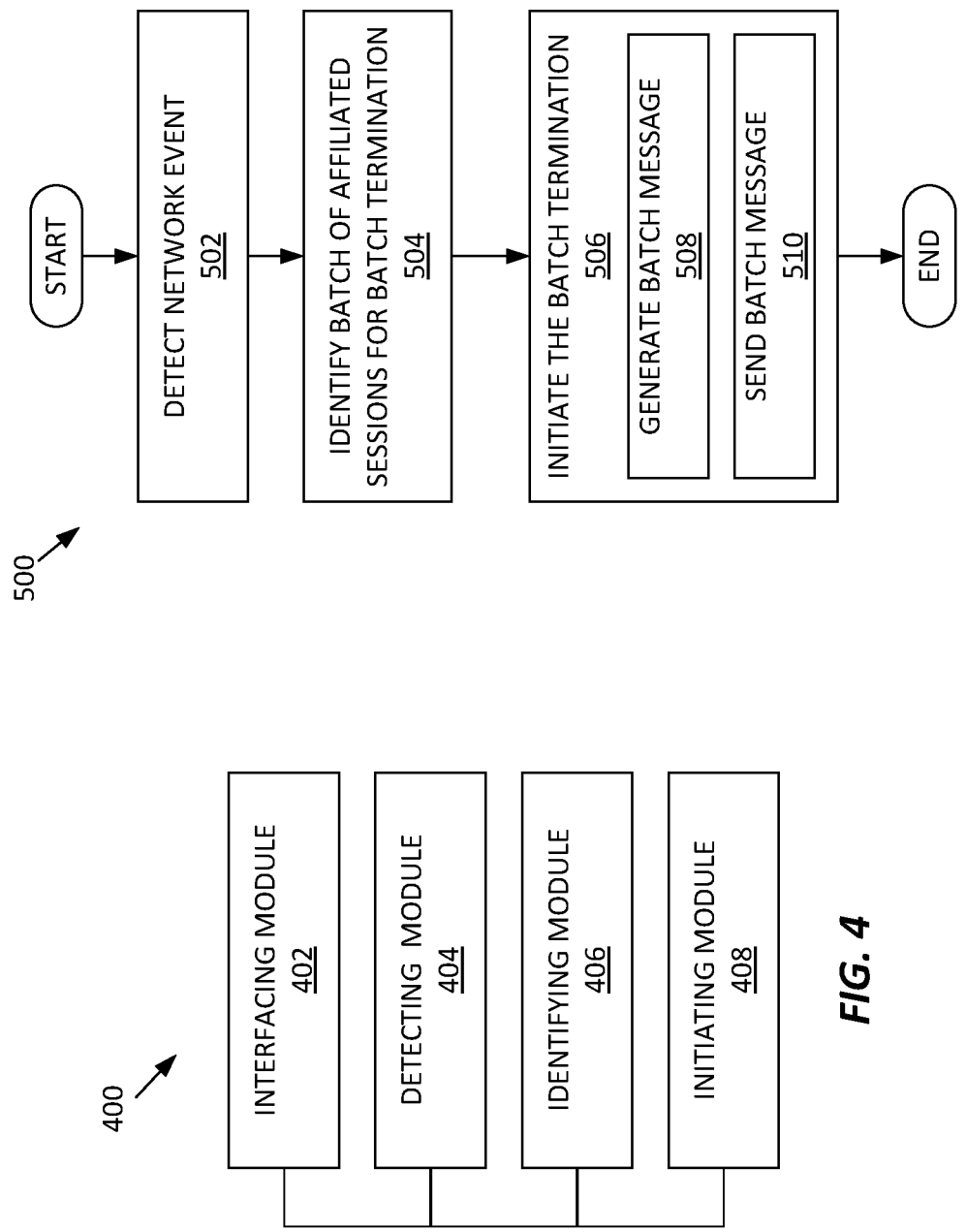
FIG. 4 is a block diagram of another example implementation of a SMF.
FIG. 5 is a logic flow diagram of one embodiment of a method of operation by a SMF.

FIG. 4 illustrates another embodiment of the SMF 32, comprising a collection or set 400 of processing units or modules, including an interfacing module 402, a detecting module 404, an identifying module 406, and an initiating module 408. The interfacing module 402 is configured to communicatively interface the SMF 32 to one or more further NFs 34 or 36. The detecting module 404 is configured to detect a network event that is external to the SMF 32 and triggers termination of a plurality of PDU sessions managed by the SMF 32, where the plurality of PDU sessions has a corresponding plurality of affiliated sessions in the network 10 associated with charging or policy control. For example, each PDU session managed by the SMF 32 has an affiliated charging session managed by a CHF 34 in the network 10 and/or an affiliated policy control session managed by a PCF 36 in the network 10.

The identifying module 406 is configured to identify a batch of affiliated sessions that is subject to a batch termination rather than individual per session terminations, among the corresponding plurality of affiliated sessions, and initiate the batch termination. The initiating module 408 is configured to initiate the batch termination, by generating a batch notification message that identifies which part of the network 10 experienced the network event, and sending the batch notification message towards a further NF 34 or 36 that supports the batch of affiliated sessions, in lieu of sending individual notification messages for the affiliated sessions in the batch of affiliated sessions. Here, references to "which part of the network" experienced the network event can broadly extend to an indication of which DN or DNs 16 were involved in the affected PDU sessions.

FIG. 5 illustrates a method 500 of operation by an SMF 32 in an example embodiment. The method 500 may be repeated or carried out in parallel or overlapping fashion with respect to multiple pluralities of PDU sessions being managed by the SMF 32 and/or with respect to respective ones among multiple further NFs 34 or 36.

The method 500 includes the SMF 32 detecting (Block 502) a network event that is external to the SMF 32 and triggers termination of a plurality of PDU sessions managed by the SMF 32. The plurality of PDU sessions has a corresponding plurality of affiliated sessions in the network 10 associated with charging or policy control.

The method 500 further includes the SMF 32 identifying (Block 504) a batch of affiliated sessions that is subject to a batch termination rather than individual per session terminations, among the corresponding plurality of affiliated sessions, and initiating (Block 506) the batch termination. Initiating the batch termination includes generating (Block 508) a batch notification message that identifies which part of the network 10 experienced the network event, and sending (Block 510) the batch notification message towards a further NF 34 or 36 that supports the batch of affiliated sessions, in lieu of sending individual notification messages for the affiliated sessions in the batch of affiliated sessions.

The network event is, for example, a path failure affecting the plurality of PDU sessions, and the batch notification message identifies the path failure. Additionally, or alternatively, the network event is a NF failure or a NF restart affecting the plurality of PDU sessions, and the batch notification message identifies the NF 26 that failed or restarted. The batch notification message in at least one embodiment identifies at least one of: a DNN identifying a DN 16 involved in the network event, a network slice 60 involved in the network event, or a NF 26 involved in the network event, for use by the further NF 34 or 36 in identifying which affiliated sessions in the corresponding plurality of affiliated sessions are affected by the network event and, therefore, belong to the batch of affiliated sessions. A DN 16 is "involved" in the network event if, for example, one or more of the terminated PDU sessions were supported by the DN 16.

In one example implementation, identifying (Block 504) the batch of affiliated sessions that is subject to the batch termination comprises, from among the corresponding plurality of affiliated sessions, identifying, as identified affiliated sessions, which affiliated sessions are supported by the further NF 34 or 36, and, from among the identified affiliated sessions, further identifying, as eligible affiliated sessions, which identified affiliated sessions are eligible for batch termination. Such processing presumes that the SMF 32 already determined that the further NF 34 or 36 supports batch termination.

Provided that the further NF 34 or 36 supports batch terminations, any given one among the identified affiliated sessions is eligible for batch termination according to one or more implementations of the SMF 32, in dependence on whether the corresponding PDU session is associated with a non-metered or non-roaming user of the communication network, or is associated with a metered or roaming user of the communication network. In the same embodiment or in other embodiments, determining that the further NF 34 or 36 supports batch terminations comprises the SMF 32 receiving an indication of support in session-establishment signaling returned from the further NF 34 or 36 in association with the SMF 32 establishing individual ones among the batch of affiliated sessions at the further NF 34 or 36.

In one example, establishing individual ones among the batch of affiliated sessions includes, for each such affiliated session, the SMF 32 providing the further NF 34 or 36 with identification information enabling batch termination operations at the further NF 34 or 36, the identification information comprising one or more NF identifiers identifying one or more NFs 26 in the network 10 that are used to support the corresponding PDU session. In one example, the affiliated sessions are affiliated charging sessions and the further NF 34 or 36 is a CHF 34 in the network 10. In another example, the affiliated sessions are affiliated policy control sessions and the further NF 34 or 36 is a PCF 36 in the network 10.

For affiliated sessions among the plurality of affiliated sessions that are not subject to batch termination, at least one embodiment of the method 500 includes the SMF 32 initiating session termination on an individual per session basis, by sending an individual notification message for each such affiliated session. Further, at least one embodiment of the method 500 includes the SMF 32 identifying whether a given one among the corresponding plurality of affiliated sessions is eligible for batch termination, based at least in part on charging or policy-control parameters associated with the corresponding PDU session. Example parameters include the roaming status of the involved UE 12 and/or the charging model used for the PDU session, such as fixed charging or consumption-based charging.

Still further, in one or more embodiments of the method 500, the method 500 includes the SMF 32 determining a service consumption measure representing an unreported service consumption associated with the batch of affiliated sessions and including the service consumption measure in the batch notification message. Additionally, or alternatively, the SMF 32 includes a timestamp in the batch notification message, indicating an event time for the network event.

Turning back to FIG. 3, one sees an example network node 24-2 operative as a CHF 34. As such, the illustrated CHF 34 can be understood as comprising communication interface circuitry 90, including transmitter circuitry 92 and receiver circuitry 94, processing circuitry 96, and storage 98, which may be used to store one or more computer programs (CPs) 100, along with historical data 102 and/or configuration data 104. With respect to the attributes and nature of the communication interface circuitry 90, the processing circuitry 96 and the configuration thereof, and the storage 98, the same characterizations made for the communication interface 70, the processing circuitry 76, and the storage 78 of the SMF 32 applies.

FIG. 3 further depicts an example network node 24-3 operative as a PCF 36. As such, the illustrated PCF 36 can be understood as comprising communication interface circuitry 110, including transmitter circuitry 112 and receiver circuitry 114, processing circuitry 116, and storage 118, which may be used to store one or more computer programs (CPs) 120, along with historical data 122 and/or configuration data 124. With respect to the attributes and nature of the communication interface circuitry 110, the processing circuitry 116 and the configuration thereof, and the storage 118, the same characterizations made for the communication interface 70, the processing circuitry 76, and the storage 78 of the SMF 32 applies.

Referring to the CHF 34 and/or the PCF 36 as a further NF 34 or 36, the further NF 34 or 36 comprises, in one or more example embodiments, communication interface circuitry 90, 110 that is configured to receive a batch notification message from a SMF 32, to initiate a batch termination by the further NF 34 or 36 of certain affiliated sessions managed by the NF 34 or 36. Here, the NF 34 or 36 manages a plurality of affiliated sessions, with each affiliated session corresponding to a PDU session managed by the SMF 32 and being an affiliated charging or policy control session. It should be understood that the NF 34 or 36 may manage additional affiliated sessions corresponding to PDU sessions being managed at one or more other SMFs in the network 10.

The processing circuitry 96, 116 of the NF 34 or 36 is operatively associated with the communication interface circuitry 90, 110 and configured to determine from information included in the batch notification message which part of the network 10 experienced a network event that triggered the SMF 32 to send the batch notification message. In an example of such determination, the batch notification message includes one or more identifiers that identify corresponding entities that were involved in the event. The NF 34 or 36 is configured to recognize these identifiers as indicating the network entity or entities involved in the network event.

The processing circuitry 96, 116 of the NF 34 or 36 is further configured to identify, based on session establishment information provided to the NF 34 or 36 for each of the affiliated sessions, the certain affiliated sessions as any affiliated session from among the plurality of affiliated sessions that have session establishment information indicating that the affiliated session is eligible for batch termination and corresponds to a PDU session supported by the part of the network 10 that experienced the network event. Correspondingly, the processing circuitry 96, 116 is configured to terminate each of the certain affiliated sessions.

The session establishment information provided to the NF 34 or 36 for each of the affiliated sessions comprises, for example, one or more first identifiers corresponding to network entities supporting the corresponding PDU session, and the information included in the batch termination message comprises one or more second identifiers corresponding to network entities affected by the network event, i.e., network entities that experienced the event or were on the control or data paths or links supporting the corresponding PDU session. Here, the processing circuitry 96, 116 is configured to identify the batch of affiliated sessions by correlating the second identifiers provided in the batch termination message with the first identifiers provided at session establishment.

In other words, for each affiliated session established at the NF 34 or 36 responsive to session-establishment signaling from the SMF 32, the session-establishment signaling includes one or more identifiers that the NF 34 or 36 records or otherwise links to the affiliated session. A later batch termination message from the SMF 32 also includes one or more identifiers. To determine which affiliated sessions are covered by the batch termination message, the NF 34 or 36 determines which ones have a recorded identifier that matches any of the identifiers conveyed in the batch termination message. While such identifiers may comprise the actual identifiers used within or by the network 10 to identify specific nodes 24, NFs 26, network slices 60, and/or DNs 16, the identifiers also may be index or symbols that point to different parts of the network 10, according to some pre-agreed rules or lookup table. In any case, it shall be broadly understood that the SMF 32 provides session-establishment information for setting up affiliated sessions, updates such information, e.g., to account for changes in the supporting NF(s) 26 used for respective ones of the corresponding PDU sessions, and provides related information in any later batch termination message, that allows the receiving NF 34 or 36 to identify the particular affiliated sessions that are covered by the batch termination message.

In the above example, the network entities identified by the first identifiers provided for each affiliated session comprise at least one of a node identifier of a NF 26 that supports the corresponding PDU session, a slice identifier of a network slice 60 that supports the corresponding PDU session, and a DNN of a DN 16 that is involved in the corresponding PDU session. Correspondingly, the network entities identified by the second identifiers included in the batch termination message comprise at least one of a node identifier of a NF 26 that experienced the network event, a slice identifier of a network slice 60 that experienced the network event, and a DNN of a DN 16 for which the network event affected connectivity. As noted, the network event may be any one or more of a NF failure, a NF restart, and a communication link failure.

The processing circuitry 96, 116 of the NF 34 or 36 is further configured to receive one or more notification messages from the SMF 32, to trigger termination of targeted ones among the plurality of affiliated sessions, on an individual per session basis, and, in response, terminate the targeted affiliated sessions. That is, the NF 34 or 36 is operative to trigger individual affiliated sessions as belonging to a batch targeted for termination, or in response to individual, per-session termination signaling.

In at least some embodiments, the processing circuitry 96, 116 is further configured to send capability signaling to the SMF 32, indicating that the NF 34 or 36 supports batch terminations of affiliated sessions. For example, to send the capability signaling to the SMF 32, the processing circuitry 96, 116 is configured in one or more embodiments to include a capability indication in session-establishment signaling sent from the NF 34 or 36 to the SMF 32 in conjunction with establishing each affiliated session among the plurality of affiliated sessions that is established at the NF 34 or 36 for the corresponding PDU session managed at the SMF 32.

The batch notification message may include a service consumption measure representing unreported service consumption associated with the certain affiliated sessions—i.e., the ones covered by a received batch termination message. In at least one embodiment of the processing circuitry 96, 116, the further NF 34 or 36 forwards or records the service consumption measure, wherein the unreported service consumption is reported on an aggregated basis or on a per-slice or per DNN basis. For example, the information is forwarded or recorded by the further NF 34 or 36, for purposes of network diagnostics or accounting reconciliation, e.g., for quantifying to some extent the financial impact of the network event giving rise to the batch termination.

Further, while a corresponding PDU session is ongoing, the SMF 32 sends updates as needed, e.g., to account for changes in which specific NFs 26 are supporting the corresponding PDU session. Such changes arise from mobility of the involved UE 12, for example, such as where the UE 12 changes from one AMF 42 to another and/or changes from one UPF 30 to another. By apprising the further NF 34 or 36 of these supporting-node changes, the further NF 34 or 36 records changes in which NF(s) 26 are associated with the respective affiliated session, so that it can later determine whether the affiliated session is covered by a batch termination message from the SMF 32 that identifies, for example, the NF(s) 26 that experienced or are affected by the network event giving rise to the batch termination message.

Figures 6, 7:
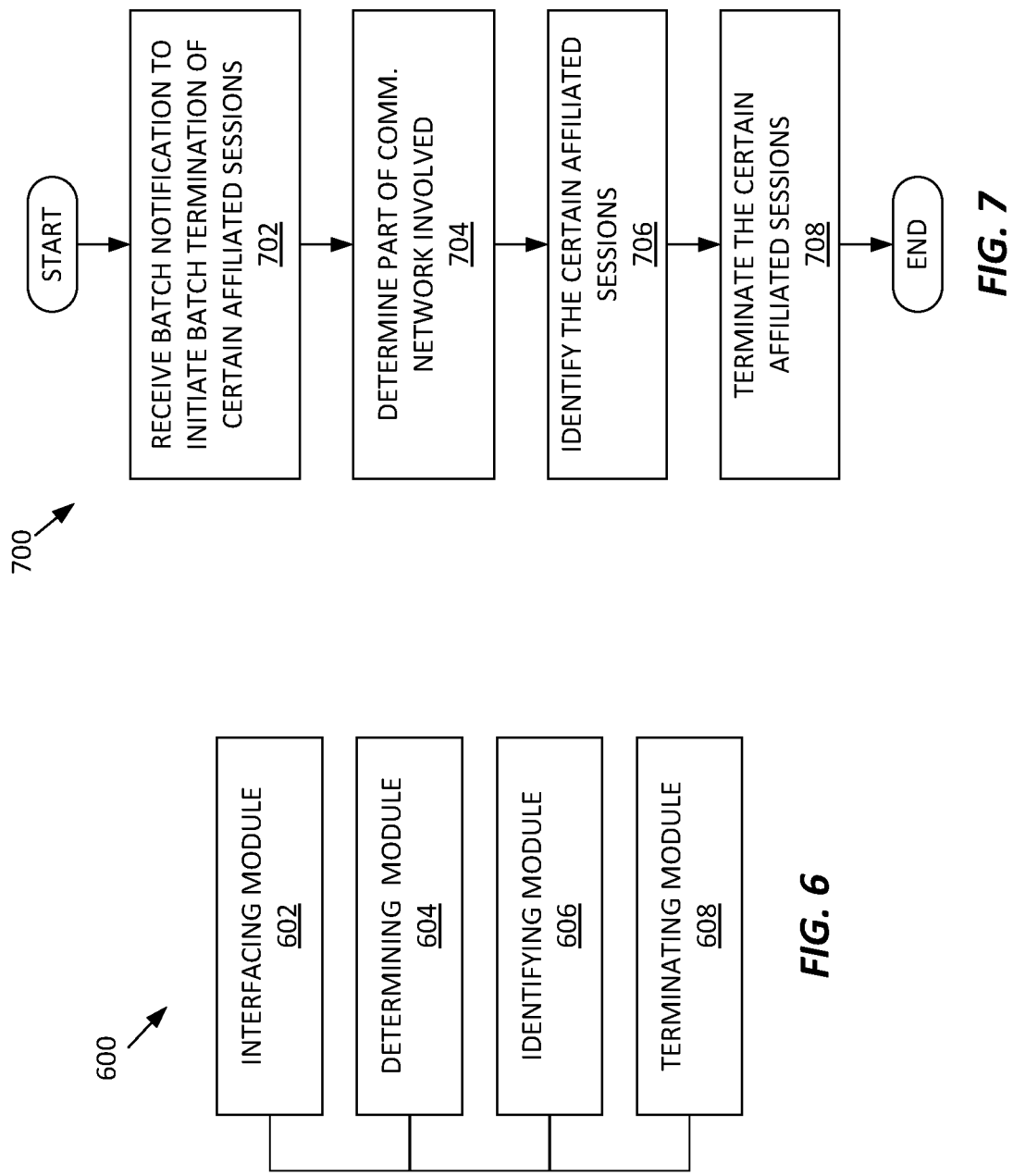
FIG. 6 is a block diagram of another example implementation of a further NF, such as a CHF or PCF.
FIG. 7 is a logic flow diagram of one embodiment of a method of operation by a further NF, such as a CHF or PCF.

FIG. 6 illustrates another embodiment of a further NF 34 or 36, comprising a collection or set 600 of processing units or modules, including an interfacing module 602, a determining module 604, an identifying module 606, and a terminating module 608. The set 600 of modules are implemented, for example, at least in part by the processing circuitry 96, 116 of the further NF 34 or 36.

The interfacing module 602 is configured to receive a batch notification message from a SMF 32, to initiate a batch termination by the further NF 34 or 36 of certain affiliated sessions managed by the NF 34 or 36. Here, the further NF 34 or 36 manages a plurality of affiliated sessions, with each affiliated session corresponding to a PDU session managed by the SMF 32 and being an affiliated charging or policy control session. It should be understood that the NF 34 or 36 may manage additional affiliated sessions corresponding to PDU sessions being managed at one or more other SMFs in the network 10.

The determining module 604 is configured to determine from information included in the batch notification message which part of the network 10 experienced a network event that triggered the SMF 32 to send the batch notification message. In an example of such determination, the batch notification message includes one or more identifiers that identify corresponding entities that were involved in the event. The further NF 34 or 36 is configured to recognize these identifiers as indicating the network entity or entities involved in the network event.

The identifying module 606 is configured to identify, based on session establishment information provided to the NF 34 or 36 for each of the affiliated sessions, the certain affiliated sessions as any affiliated session from among the plurality of affiliated sessions that have session establishment information indicating that the affiliated session is eligible for batch termination and corresponds to a PDU session supported by the part of the network 10 that experienced the network event. Correspondingly, the terminating module 608 is configured to terminate each of the certain affiliated sessions.

FIG. 7 illustrates an example method 700 for charging or policy control in the network 10 as performed by a further NF 34 or 36. The method 700 may be understood as a complement to the earlier-described method 500. The method 700 may be performed on a repeating basis or in parallel or overlapping fashion, as needed, for any number of involved affiliated sessions and with respect to one or more SMFs 32 in the network 10.

The method 700 includes the further NF 34 or 36 receiving (Block 702) a batch notification message from a SMF 32 to initiate a batch termination by the NF 34 or 36 of certain affiliated sessions managed by the NF 34 or 36. Here, the NF 34 or 36 manages a plurality of affiliated sessions, each affiliated session corresponding to a PDU session managed by the SMF 32 and being an affiliated charging or policy control session.

The method 700 further includes the NF 34 or 36 determining (Block 704) from information included in the batch notification message which part of the network 10 experienced a network event that triggered the SMF 32 to send the batch notification message, and identifying (Block 706), based on session establishment information provided to the NF 34 or 36 for each of the affiliated sessions, the certain affiliated sessions as any affiliated session from among the plurality of affiliated sessions that have session establishment information indicating that the affiliated session is eligible for batch termination and corresponds to a PDU session supported by the part of the network 10 that experienced the network event. Still further, the method 700 includes the further NF 34 or 36 terminating (Block 708) each of the certain affiliated sessions.

The session establishment information provided to the NF 34 or 36 for each of the affiliated sessions comprises, for example, one or more first identifiers corresponding to network entities supporting the corresponding PDU session. In such embodiments, the information included in the batch termination message comprises one or more second identifiers corresponding to network entities affected by the network event. The NF 34 or 36 identifies the batch of affiliated sessions by correlating the second identifiers with the first identifiers. In other words, as the NF 34 or 36 establishes an affiliated session corresponding to a PDU session managed by the SMF 32, it receives information that identifies one or more network entities associated with the corresponding PDU session. Because the batch termination message includes the same type(s) of identities, to indicate the network entity or entities involved in the network event giving rise to the batch termination, the NF 34 or 36 can identify which ones of its affiliated sessions have corresponding PDU sessions that are affected by the network event and, therefore, to be included in the batch termination.

Note, too, that the session establishment information provided to the NF 34 or 36 in one or more embodiments includes an indication of whether the affiliated session being established can be batch terminated, in addition to information indicating the network entity or entities that are associated with the corresponding PDU session. Thus, when the NF 34 or 36 subsequently receives a batch termination message, it already knows which ones of its affiliated sessions are subject to batch termination, and, from the information included in the batch termination message regarding the network entity or entities involved in the network event that prompted the batch termination message, the NF 34 or 36 identifies the specific affiliated sessions that are covered (implicated) by the batch termination message.

For example, the network entities identified by the first identifiers provided when establishing each affiliated session comprise at least one of a node identifier of a NF 26 that supports the corresponding PDU session, a slice identifier of a network slice 60 that supports the corresponding PDU session, and a DNN of a DN 16 that is involved in the corresponding PDU session. Correspondingly, the network entities identified by the second identifiers included in a batch termination message comprise at least one of a node identifier of a NF 26 that experienced the network event, a slice identifier of a network slice 60 that experienced the network event, and a DNN of a DN 16 for which the network event affected connectivity. The network event is one of a NF failure, a NF restart, and a communication link failure.

The method 700 may further include the NF 34 or 36 receiving one or more notification messages from the SMF 32, to trigger termination of targeted ones among the plurality of affiliated sessions, on an individual per session basis. In response to each such message, the NF 34 or 36 terminates the targeted affiliated session. Still further, in one or more embodiments, the method 700 includes the NF 34 or 36 sending capability signaling to the SMF 32, indicating that the NF 34 or 36 supports batch terminations of affiliated sessions. In at least one such embodiment, the NF 34 or 36 sends the capability signaling to the SMF 32 by including a capability indication in session-establishment signaling sent from the NF 34 or 36 to the SMF 32 in conjunction with establishing each affiliated session among the plurality of affiliated sessions that is established at the NF 34 or 36 for the corresponding PDU session managed at the SMF 32.

Still further, in one or more embodiments of the method 700, the batch notification message includes a service consumption measure representing unreported service consumption associated with the certain affiliated sessions. In such cases, the method 700 includes the NF 34 or 36 forwarding or recording the service consumption measure, e.g., for accounting and/or diagnostic reasons. The unreported service consumption is reported on an aggregated basis or on a per-slice or per DNN basis.

For example details regarding system restoration procedures in the context of an NF failure or restart, refer to 3GPP TS 23.527 V16.1.0 (2019 Sep. 19). Section 6.2.2 relates to NF failure and Section 6.2.3 relates to NF (service) restart.

For example details regarding charging operations, including charging-session termination operations, refer to 3GPP TS 32.291 V16.1.0 (2019 Sep. 25). Section 5.2.2.4 details particular operations associated with terminating charging sessions. According to "Nchf_ConvergedCharging_Release Operation" details, the "Nchf_ConvergedCharging_Release service operation" is the mechanism for a charging trigger function (CTF) to terminate a charging session. Procedures that use the Nchf_ConvergedCharging_Release service operation include (a) expiry of unit count inactivity timer, and (b) abort notification received from a CHF 34.

For example details regarding policy control and policy session termination, refer to 3GPP TS 29.513 V16.1.0 (2019 Sep. 27). In particular, a SMF 32 may invoke the "Npcf_SMPolicyControl_Delete service operation" by sending an HTTP POST request to the "Individual SM Policy" resource, to request a PCF 36 to delete the context of the SM-related policy. The request operation may include usage monitoring information if applicable and access network information. In response, the PCF 36 removes PCC Rules for the terminated PDU session and sends an HTTP "204 No Content" response to the SMF 32.

To better understand the "cleanup" operations performed by SMF 32 when a network event occurs that triggers the termination of PDU sessions being managed by the SMF 32, it may be helpful to identify example network events. In a non-roaming network example, an AMF 42 supporting one or more of the PDU sessions managed by the SMF 32 fails or restarts, or an associated communication link to/from the AMF 42 fails. Similar event scenarios apply with respect to a PCF 36 supporting one or more of the PDU sessions, or a UPF 30 supporting one or more of the PDU sessions. The UPF in question may be an Uplink Classifier (UL-CL) UPF or an anchor UPF.

Refer back to FIG. 1, which depicts interface points NG1 between a UE 12 and a supporting AMF 42, NG2 between the supporting gNB 22 and the supporting AMF 42, NG3 between the supporting gNB 22 and the supporting UPF 30, and NG4 between the supporting SMF 32 and the supporting UPF 30. Here, the term "supporting" refers to the involved NF, slice, or DN as providing processing or connectivity for the PDU session in question. In this context, the supporting SMF 32 provides cleanup for PDU sessions that are managed by it, in response to those PDU sessions being terminated by a NF failure, a NF restart, or a link failure.

Similar failure scenarios exist in a roaming scenario, where a Visited SMF (V-SMF) may fail or restart, or a communication path therewith fails. The same applies for a Visited PCF (V-PCF) and/or a UPF in a visited network.

As a key recognition herein, a PCF in a 5G implementation of the network 10 may handle policy control for millions of UEs 12, and similar scale applies to an AMF 42 in the 5G context. Even a UPF 30 in the 5G context may handle UP connections for a million UEs 12. Thus, providing a mechanism for a SMF 32 to use a single batch termination message to initiate the termination of batches of affiliated charging or policy control sessions saves significant signaling overhead, as compared to carrying out per-session termination signaling for every involved affiliated session. A further key recognition herein is the need for signaling protocols or defined information exchanges between a SMF 32 and a further NF 34 or 36 as part of establishing the affiliated sessions and in conjunction with initiating a batch termination, so that the further NF 34 or 36 can reliably and quickly identify which ones of the affiliated sessions currently handled by it are covered by an incoming batch termination message.

In more detail, one embodiment contemplated herein involves the SMF 32 informing a CHF/PCF 34, 36 of the following information during the establishment of a charging/policy session at the CHF/PCF 34, 36 in correspondence with a PDU session managed at the SMF 32:

(a) a "noTerminationForNfFailure" information element, to indicate that the charging/policy session enables a "no termination for nf failure" function—i.e., no per-session termination is required and batch termination may be used—where "nf" denotes "network function"; (b) a "usedNodeInfo" information element, to indicate NF identifiers (IDs) for the corresponding PDU session—i.e., identifiers for the NFs 26 that are supporting the corresponding PDU session, with examples being smf-id, amf-id, pcf-id, and/or upf-id; (c) a "sliceInfo" information element indicating the involved network slice 60; and (d) a "dnnInfo" information element, to indicate the involved DN 16, e.g., the applicable DNN.

In reply, the CHF/PCF 34, 36 sends a response to the SMF 32, with the response message including the "noTerminationForNfFailure" indication, to indicate to the SMF 32 that the CHF/PCF 34, 36 enables the "no termination for of failure" function—batch termination—for the affiliated session being established. In dependence on its capabilities or the applicable circumstances, the CHF/PCF 34, 36 may include a "noTerminationLevel:slice" information element, to indicate that it supports batch termination only at the network-slice level.

Of course, when the UE 12 associated with the PDU session changes supporting NFs 26, e.g., because of mobility, the SMF 32 may send an update message to the CHF/PCF 34, 36, with an identification of the new supporting NF 26. Providing updates allows the CHF/PCF 34 to keep an accurate record of the NFs 26 supporting a PDU session corresponding to an affiliated session at the CHF/PCF 34, 36, so that the CHF/PCF 34, 36 can determine whether that affiliated session is covered by an incoming batch termination message from the SMF 32.

Upon the SMF 32 detecting a NF failure or restart or link failure affecting PDU sessions managed by the SMF 32, it determines whether any of those PDU sessions have corresponding affiliated sessions at a CHF/PCF 34, 36 that supports batch termination and determines whether any of those corresponding affiliated sessions are eligible for batch termination, e.g., as function of one or more charging or policy-control parameters. For a CHF/PCF 34, 36 that supports batch termination and has corresponding affiliated sessions that are eligible for batch termination, the CHF/PCF 34, 36 generates and sends a corresponding batch termination message, instead of generating and sending individual termination messages.

In at least one embodiment, the batch termination message includes the following attributes for use by the CHF/PCF 34, 36 in identifying the affiliated sessions covered by the batch termination message: a failedNodeId information element to indicate the NF(s)/node(s) that failed or restarted, a noTerminationLevel information element, and a failureTimestamp information element. Additionally, the batch termination message may include a sliceName information element and/or a DNN information element, to indicate the network slice 60 and/or DN 16 involved in the network event.

The CHF/PCF 34, 36, uses the failedNodeId and sliceName to filter all the affiliated sessions that match the sliceName and failedNodeID, as known from the earlier session-establishment signaling received from the SMF 32. The CHF/PCF 34, 36 terminates all matching affiliated sessions locally, without waiting for a termination of each from the SMF. For affiliated sessions at the CHF/PCF 34, 36 that are not eligible for batch termination, the CHF/PCF 34, 36 follows normal or default termination procedures, which involve per-session signaling.

Additionally, or alternatively, the CHF/PCF can subscribe to an NRF 44, for notifications of network events—e.g., notifications of NF failures or restarts—and use the information conveyed in such notifications to filter its affiliated sessions to identify those affiliated sessions that are subject to batch termination in response to the notification. Such operation can be understood as the CHF/PCF 34, 36 receiving an implicit batch termination message and it should be understood that the CHF/PCF still needs the session-establishment information from the SFM 32, for comparison against the information conveyed in the notification, to identify which affiliated sessions are subject to batch termination in response to the notification.

Figure 8:
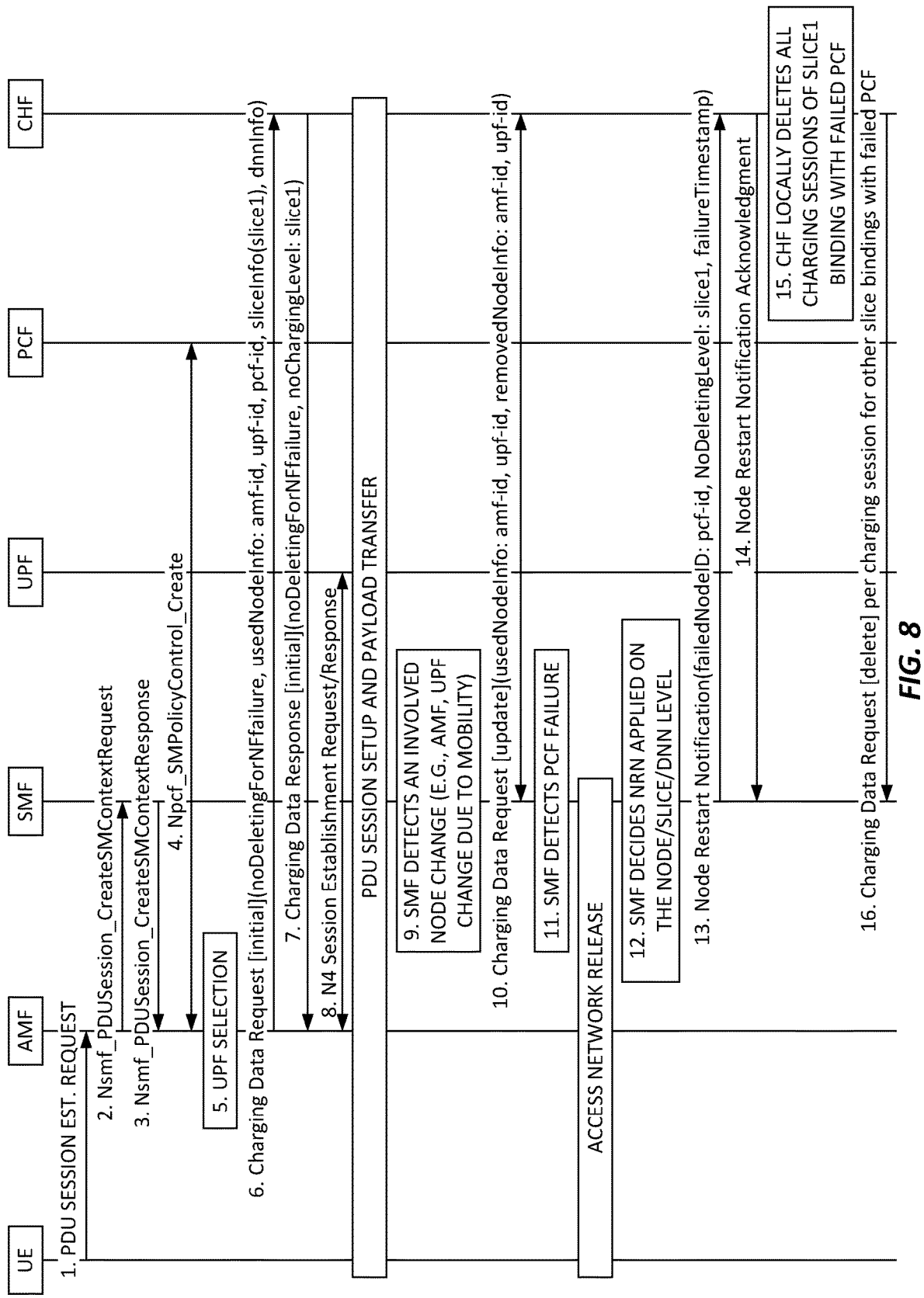
FIG. 8 is a signal flow diagram of one embodiment of signaling and related operations carried out by and between various NFs, for batch termination of sessions affiliated with terminated Protocol Data Unit (PDU) sessions, such as affiliated charging sessions.

FIG. 8 illustrates one embodiment of signaling and operations contemplated herein for batch terminations. Although some of the following message, command, or value names are taken from the 5G network context, the applicability of the operations is not restricted to that context. At Step 1, a UE sends a PDU Session Establishment Request to an AMF. At Step 2, the AMF sends a Nsmf_PDUSession_CreateSMContextRequest message to a SMF. At Step 3, the SMF sends a Nsmf_PDUSession_CreateSMContextResponse message to the AMF. At Step 4, the SMF sends a Npcf_SM-PolicyControl_Create message to a PCF, to setup a policy session corresponding to the PDU session, and the PCF sends the corresponding response. At Step 5, the SMF selects a UPF to support the PDU session. At Step 6, the SMF sends an initial Charging Data Request to a CHF, to create a charging session corresponding to the PDU session, where the message includes the following attributes: noTerminationForNfFailure to indicate that the charging session is eligible for batch termination, usedNodeInfo to indicate the NFs/nodes supporting the PDU session (e.g., smf-id; amf-id, pcf-id, upf-id), sliceInfo to indicate the network slice involved with the PDU session, and dnnInfo to indicate the DN involved with the PDU session.

At Step 7, CHF sends an initial Charging Data Response to the SMF, where the response includes the noTerminationForNfFailure value or indicator, to indicate that the CHF supports batch termination for the charging session. The response also may include a noTerminationLevel:slice1 indicator or value, to indicate for which network slice or slices the CHF supports batch termination. At Step 8, the SMF sends a N4 Session Establishment Request to the UPF, and the UPF sends N4 Session Establishment Response to the SMF. At Step 9, after the PDU session is established and payload is transferred in the PDU session, the SMF detects a supporting NF/Node change, such as a change in the supporting AMF and UPF. At Step 10, the SMF sends a Charging Data Request (update) to the CHF, e.g., with the updated information, such as a usedNodeInfo:amf-id,upf-id to indicate the changed AMF and UPF, and a removedNodeInfo:ufp-id to indicate the removed or old UPF. At Step 11, the SMF detects a PCF failure, as an example network event affecting PDU sessions managed by the SMF, and the SMF correspondingly recognizes the need for cleanup for all the affected PDU sessions that are managed by it. At Step 12, the SMF determines that the "no termination for nf failure" procedure applies on the node/slice/dnn level, according to local configuration maintained at the SMF or as indicated by the CHF. Here, saying that the "no termination for nf failure" procedure applies is another way of saying that individual terminations may be skipped in favor of performing a batch termination for the eligible affiliated sessions.

At Step 13, The SMF sends one Node Restart Notification (failedNodeId: pcf-id, noTerminationLevel: slice1) to the CHF, and it may include a timestamp for the network event and total (communication service) volume used up to the network event. Note that the network event may cause the SMF to undertake the same actions towards one or more other CHFs handling affiliated sessions corresponding to other affected PDU sessions managed at the SMF. If the SMF has distributed the affiliated charging sessions over several CHFs, rather than establishing all of them at one CHF, the SMF may use a correlationId or other indicator to indicate that a given batch termination message is sent to different CHFs; otherwise the post-processing system(s) would not be able to recognize that these batch termination messages are all related to the same network event.

At Step 14, The CHF sends a Node Restart Notification Acknowledgement to the SMF, and at Step 15, the CHF uses the failed pcf-id and slice1 information to filter through the charging sessions it currently supports, to identify which ones have associated slice and PCF identifiers that match the slice1 and failed pcf-id value provided in the batch termination message. The CHF then terminates the matching charging sessions locally, without waiting for individualized ChargingDataRequest termination signaling from the SMF. At Step 16, the CHF undertakes per session termination procedures, as needed, and responsive to normal or default per-session termination signaling. Note that rather than receiving the batch termination message explicitly from the SMF, the CHF may receive it implicitly, as a NF failure/ restart notification from an NRF, in cases where the CHF subscribes for such notifications.

Figure 9:
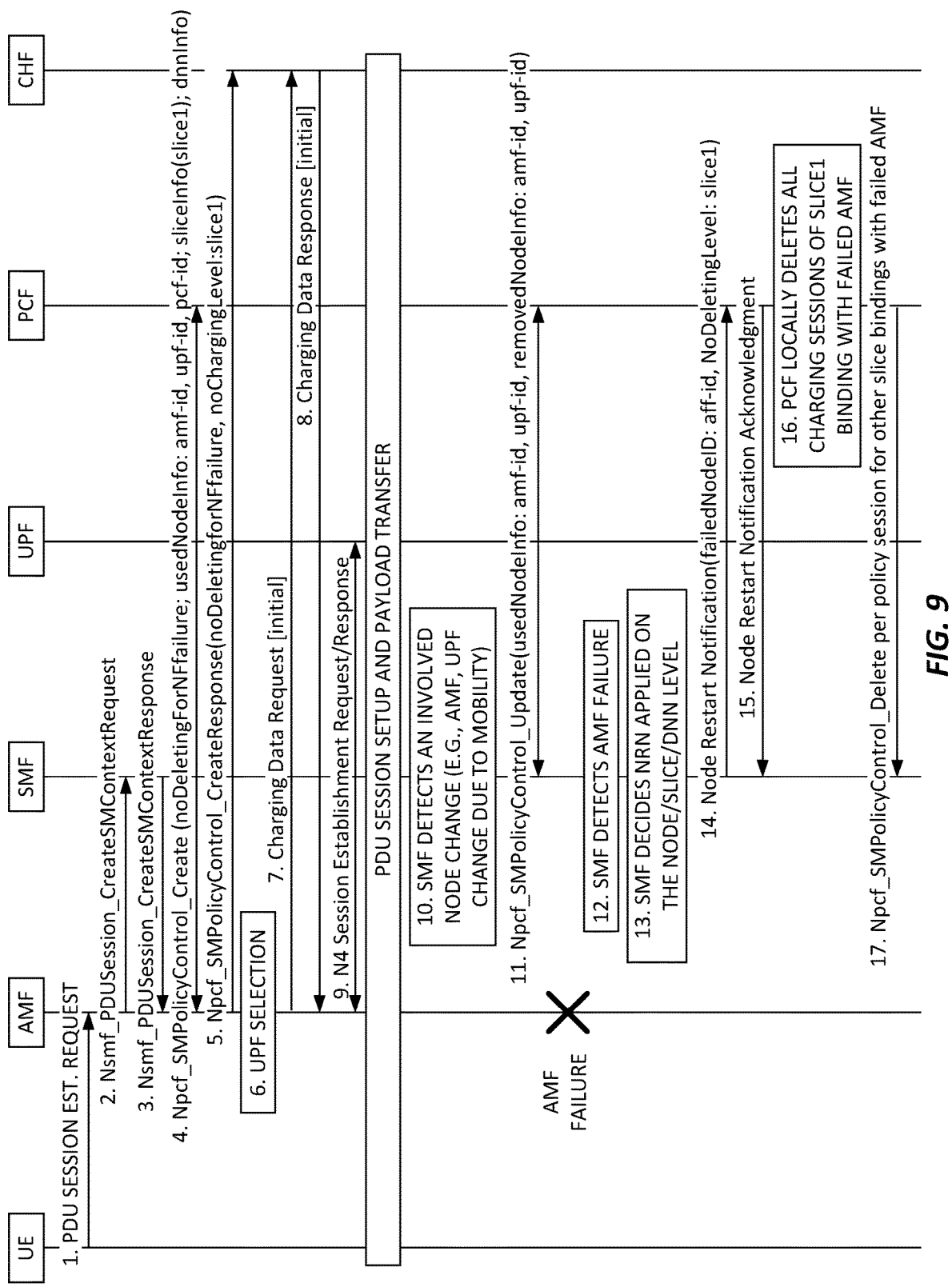
FIG. 9 is a signal flow diagram of one embodiment of signaling and related operations carried out by and between various NFs, for batch termination of sessions affiliated with terminated Protocol Data Unit (PDU) sessions, such as affiliated policy control sessions.

Whereas FIG. 8 illustrated one embodiment of batch termination operations as between a SMF and a CHF, FIG. 9 illustrates one embodiment of batch termination operations as between a SMF and a PCF. Although some of the following message, command, or value names are taken from the 5G network context, the applicability of the operations is not restricted to that context.

At Step 1, a UE sends a PDU Session Establishment Request to an AMF. At Step 2, the AMF sends a Nsmf-PDUSession_CreateSMContextRequest to a SMF. At Step 3, the SMF sends a Nsmf-PDUSession_CreateSMContextResponse to the AMF. At Step 4, The SMF sends Npcf_SMPolicyControl_Create to a PCF to create a policy session affiliated with the PDU session. The message includes the following example information elements (indicators or values): noTerminationForNfFailure to indicate that the policy session enables the "no termination for of failure" function—i.e., is eligible for batch termination; usedNodeInfo, to indicate IDs of the NFs/nodes supporting the PDU session (e.g., smf-id; amf-id, pcf-id, upf-id); sliceInfo to indicate the name of the supporting network slice; and dnnInfo to indicate the DNN of the DN involved in the PDU session. At Step 5, the PCF returns a corresponding response that includes the noTerminationForNfFailure indication, to signify that the PCF supports batch termination of policy sessions. The return response also may indicate the network level for which the PCF supports batch termination, such as the PCF indicating that it supports batch termination of policy sessions involving the same network slice—i.e., slice-level batch terminations. Such information may indicate the particular slice or slices for which batch termination is supported.

At Step 6, the SMF selects a UPF for the PDU session. At Step 7, the SMF sends an initial Charging Data Request to the CHF to create a charging session affiliated with the PDU session. At Step 8, the CHF sends an initial Charging Data Response to the SMF. At Step 9, the SMF sends an N4 Session Establishment Request to the UPF, and the UPF sends an N4 Session Establishment Response to the SMF. At Step 10, which is after the PDU session is established and payload has been transferred in the PDU session, the SMF detects a supporting NF/Node change, e.g., a changed AMF and UPF, arising from mobility of the UE. Correspondingly, at Step 11 the SFM sends a Npcf_SMPolicyControl_Create message to the PCF, to indicate the supporting NF/node changes, e.g., usedNodeInfo:amf-id, upf-id to indicate the new AMF and UPF and removedNodeInfo:upf-id to indicate the old AMF and the old UPF.

At Step 12, the SMF detects an AMF failure, and recognizes that it needs to perform cleanup for all the affected PDU sessions being managed by the SMF. At Step 13, the SMF determines or remembers that the PCF supports batch termination at the slice level, e.g., based on the local configuration or an indication from the PCF. Assuming that at least some of the PDU sessions managed at the SMF have charging or policy-control parameters that make their affiliated policy sessions eligible for batch termination and assuming that at least some of those affiliated policy sessions are handled by the PCF, the SMF sends a Node Restart Notification (failedNodeId: amf-id, noTerminationLevel: slice1) to the PCF, to trigger batch termination of the eligible policy sessions.

At Step 15, the PCF sends a Node Restart Notification Acknowledgement to the SMF. At Step 16, the PCF uses the failed amf-id and slice1 information included in the restart notification, serving as a batch termination message, to filter through the policy sessions currently supported by it, to find those having associated slice and PCF information that matches the notification. The PCF deems these matching policy sessions as being covered by the batch termination implied by the node restart notification and, at Step 16, it deletes them locally, without waiting for Npcf_SMPolicyControl_Delete signaling from the SMF—i.e., without requiring for normal or default per-session termination signaling.

At Step 17, the PCF carries out per-session terminations for policy sessions that are affected by the node restart. Such operations involved per-session signaling with the SMF, e.g., the normal Npcf_SMPolicyControl_Delete signaling with corresponding Npcf_SMPolicyControl_Delete Responses per PDU session. As noted for the CHF, the PCF may subscribe for NF/node updates and network-event notifications from an NRF, such that event notifications incoming from the NRF serve as an implicit batch termination message.

With the above examples and variations in mind, an example SMF 32 is configured for the following operations:
during or for establishment of an affiliated session at a further NF 34 or 36 in correspondence with a PDU session managed by the SMF 32: (a) determine whether the NF 34 or 36 supports batch termination; (b) determine whether batch termination is appropriate for the affiliated session, based on one or more parameters associated with the PDU session, such as how the PDU session is being charged or what policies apply to the PDU session; (c) provide session-establishment information to the further NF 34 or 36 indicating whether the affiliated session is appropriate for batch termination, and indicating one or more identifiers associated with the PDU session corresponding to the affiliated session;

while a given PDU session managed by the SMF 32 is ongoing, and where the further NF 34 or 36 supporting the corresponding affiliated session supports batch termination: (d) providing identifier updates to the further NF 34 or 36, to account for changes in the identifiers that are associated with the PDU session, e.g., to account for changes in which NFs 26 support the PDU session because of UE mobility; and responsive to detecting a network event that triggers termination of one or more PDU sessions managed by the SMF 32: (e) determine whether any of the PDU sessions have affiliated sessions at a further NF 34 or 36 that supports batch termination; and (f) responsive to a positive determination for (e), provide a batch termination message for each such further NF 34 or 36, the batch termination message including identifiers that enable each such further NF 34 or 36 to identify the particular affiliated sessions that are covered by the batch termination message. Note that the SMF 32 may condition its sending of a batch termination message to a further NF 34 or 36 on the further NF 34 or 36 supporting one or more affiliated sessions that were earlier determined by the SMF 32 to be appropriate for batch termination, e.g., during session establishment.

An affiliated session is a candidate for batch termination if it is appropriate for batch termination in view of the policy or charging parameters associated with the corresponding PDU session, further if it corresponds to a PDU session affected by the network event, and further if the batch-termination capability of the further NF 34 or 36 accommodates batch termination in the context of the involved network event, e.g., subject to any slice or DNN restrictions on batch termination at the further NF 34 or 36. Of course, if a network event affects multiple network slices 60 or DNs 16 and the further NF 34 or 36 performs batch terminations at the per-slice or per-DN level, the SMF 32 may generate multiple batch termination messages, for each involved network slice 60 and/or each involved DN 16.

Correspondingly, an example further NF 34 or 36 that supports batch termination is configured for the following operations:

during or for establishment of an affiliated session at the further NF 34 or 36 in correspondence with a PDU session managed by the SMF 32: (a) determine whether session-establishment signaling from the SMF 32 indicates that the affiliated session is appropriate for batch termination; (b) at least when the affiliated session is appropriate for batch termination, record identifiers included in the session-establishment signaling for associative linking to the affiliated session; and (c) send a return indication of batch-termination support to the SMF 32, with any applicable limitations, such as per-slice or per DN batching;

while a given PDU session managed by the SMF 32 is ongoing, and where the NF 34 or 36 supports an affiliated session corresponding to the PDU session: (d) receiving identifier updates from the SMF 32, to account for changes in the identifiers that are associated with the PDU session, e.g., to account for changes in which NFs 26 support the PDU session because of UE mobility; and responsive to receiving a batch termination message from the SMF 32: (e) for each affiliated session that corresponds to a PDU session managed by the SFM 32 and was indicated as being appropriate for batch termination, compare the identifier(s) conveyed in the batch termination message to the identifier(s) associatively linked to each such affiliated session as known from the establishment signaling; (f) based on the comparison, determine the particular affiliated sessions at the further NF 34 or 36 that are covered by the batch termination message; and (g) perform termination of each affiliated session that is covered by the batch termination message, without requiring or waiting for per-session termination signaling.

As a further example of processing by a SMF 32, a SMF 32 in one or more embodiments herein performs a method that includes:

for each affiliated session established at a further NF 34 or 36, for a corresponding PDU session managed by the SMF 32, indicating to the further NF 34 or 36 whether batch cancelation is appropriate for the affiliated session and indicating network identifiers that are associated with the PDU session, including initially indicating network identifiers that are applicable when establishing the affiliated session, and later indicating any updates regarding the applicable network identifiers; and responsive to detecting a network event that triggers termination of PDU sessions at the SMF 32 that have corresponding affiliated sessions at the further NF 34 or 36 and provided that the SMF 32 has determined that the further NF 34 or 36 supports batch termination, sending an event notification message for the further NF 34 or 36, where the event notification message includes one or more network identifiers indicating network entities involved in the network event, to thereby enable the further NF 34 or 36 to identify which ones of the affiliated sessions that its supports and were indicated as being appropriate for batch termination are affected by the network event.

A corresponding example of processing by the further NF 34 or 36 includes:

for each affiliated session established at the further NF 34 or 36, for a corresponding PDU session managed by the SMF 32, receiving an indication of whether batch cancelation is appropriate for the affiliated session and an indication of network identifiers that are associated with the PDU session, including receiving an initial indication of the network identifiers that are applicable when establishing the affiliated session, and later receiving updates, if any, regarding the applicable network identifiers; and responsive to receiving an event notification message from the SMF 32, where the event notification message includes one or more network identifiers indicating network entities involved in the network event, identifying which affiliated sessions at the further NF 34 or 36 are to be batch-termination in response to the event notification message, based on, from among those affiliated sessions corresponding to PDU sessions at the SMF 32 and having been indicated by the SMF 32 as being appropriate for batch termination, determining which affiliated sessions correspond to PDU sessions affected by the network event, based on comparing the applicable network identifiers to the one or more network identifiers receives in the event notification message.

Among the multiple advantages gained from the batch termination techniques disclosed herein are significant reductions in termination signaling, arising from eliminating the need for per-session termination signaling for potentially large batches of charging and/or policy control sessions affiliated with PDU sessions that are terminated as a consequence of a network event. Further, batch termination operations reduce the processing load(s) at the involved NFs, e.g., the involved SMF, CHF and/or PCF.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of operation by a Session Management Function (SMF) in a communication network, the method comprising:

detecting a network event that is external to the SMF and triggers termination of a plurality of Protocol Data Unit (PDU) sessions managed by the SMF, the plurality of PDU sessions having a corresponding plurality of affiliated sessions in the communication network associated with charging or policy control;

identifying a batch of affiliated sessions that is subject to a batch termination rather than individual per session terminations, among the corresponding plurality of affiliated sessions; and initiating the batch termination by:
  generating a batch notification message that identifies which part of the communication network experienced the network event; and
  sending the batch notification message towards a further Network Function (NF) that supports the batch of affiliated sessions, in lieu of sending individual notification messages for the affiliated sessions in the batch of affiliated sessions.

2. The method of claim 1, wherein the network event is a service or path failure affecting the plurality of PDU sessions, and where the batch notification message identifies the service or path failure.

3. The method of claim 1, wherein the network event is a NF failure or a NF restart affecting the plurality of PDU sessions, and wherein the batch notification message identifies the NF that failed or restarted.

4. The method of claim 1, wherein the batch notification message identifies at least one of: a Data Network Name (DNN) involved in the network event, or a network slice involved in the network event, or a NF involved in the network event, for use by the further NF in identifying which affiliated sessions in the corresponding plurality of affiliated sessions are affected by the network event and, therefore, belong to the batch of affiliated sessions.

5. The method of claim 1, wherein identifying the batch of affiliated sessions that is subject to the batch termination comprises, from among the corresponding plurality of affiliated sessions, identifying, as identified affiliated sessions, which affiliated sessions are supported by the further NF, and, from among the identified affiliated sessions, further identifying, as eligible affiliated sessions, which identified affiliated sessions are eligible for batch termination.

6. The method of claim 5, wherein, provided that the further NF supports batch terminations, any given one among the identified affiliated sessions is eligible for batch termination in dependence on whether the corresponding PDU session is associated with a non-metered or non-roaming user of the communication network, or is associated with a metered or roaming user of the communication network.

7. The method of claim 5, further comprising determining that the further NF supports batch terminations comprises receiving an indication of support in session-establishment signaling returned from the further NF in association with the SMF establishing individual ones among the batch of affiliated sessions.

8. The method of claim 7, wherein establishing individual ones among the batch of affiliated sessions includes, for each such affiliated session, the SMF providing the further NF with identification information enabling batch termination operations at the further NF, the identification information comprising one or more NF identifiers identifying one or more NFs in the communication network that are used to support the corresponding PDU session.

9. The method of claim 8, wherein the affiliated sessions are affiliated charging sessions and the further NF is a Charging Function (CHF) in the communication network, or wherein the affiliated sessions are affiliated policy control sessions and the further NF is a Policy Control Function (PCF) in the communication network.

10. The method of claim 1, further comprising, for affiliated sessions among the plurality of affiliated sessions that are not subject to batch termination, initiating session termination on an individual per session basis by sending an individual notification message for each such affiliated session.

11. The method of claim 1, wherein the method includes identifying whether a given one among the corresponding plurality of affiliated sessions is eligible for batch termination based at least in part on charging or policy-control parameters associated with the corresponding PDU session.

12. The method of claim 1, further comprising determining a service consumption measure representing an unreported service consumption associated with the batch of affiliated sessions and including the service consumption measure in the batch notification message, wherein the service consumption measure is reported as an aggregated consumption, or on a per network-slice or per Data Network Name (DNN) basis.

13. The method of claim 1, further comprising including a timestamp in the batch notification message, indicating an event time for the network event.

14. A method of operation by a Network Function (NF) in a communication network, for charging or policy control in the communication network, the method comprising:
  receiving a batch notification message from a Session Management Function (SMF) to initiate a batch termination by the NF of certain affiliated sessions managed by the NF, wherein the NF manages a plurality of affiliated sessions, each affiliated session corresponding to a Protocol Data Unit (PDU) session managed by the SMF and being an affiliated charging or policy control session;
  determining from information included in the batch notification message which part of the communication network experienced a network event that triggered the SMF to send the batch notification message;
  identifying, based on session establishment information provided to the NF for each of the affiliated sessions, the certain affiliated sessions as any affiliated session from among the plurality of affiliated sessions that have session establishment information indicating that the affiliated session is eligible for batch termination and corresponds to a PDU session supported by the part of the communication network that experienced the network event; and
  terminating each of the certain affiliated sessions.

15. A Session Management Function (SMF) configured for use in a communication network, the SMF comprising:
  communication interface circuitry configured for communicatively coupling the SMF to other Network Functions (NFs) in the communication network; and
  processing circuitry operatively associated with the communication interface circuitry, and configured to:
    detect a network event that is external to the SMF and triggers termination of a plurality of Protocol Data Unit (PDU) sessions managed by the SMF, the plurality of PDU sessions having a corresponding plurality of affiliated sessions in the communication network associated with charging or policy control;
    identify a batch of affiliated sessions that is subject to a batch termination rather than individual per session terminations, among the corresponding plurality of affiliated sessions; and
    initiate the batch termination, including:
      generate a batch notification message that identifies which part of the communication network experienced the network event; and
      send the batch notification message towards a further NF that supports the batch of affiliated sessions, in lieu of sending individual notification messages for the affiliated sessions in the batch of affiliated sessions.

16. A network function (NF) configured for charging or policy control in a communication network, and the NF comprising:

communication interface circuitry configured to receive a batch notification message from a Session Management Function (SMF) to initiate a batch termination by the NF of certain affiliated sessions managed by the NF, wherein the NF manages a plurality of affiliated sessions, each affiliated session corresponding to a Protocol Data Unit (PDU) session managed by the SMF and being an affiliated charging or policy control session; and processing circuitry operatively associated with the communication interface circuitry and configured to:
determine from information included in the batch notification message which part of the communication network experienced a network event that triggered the SMF to send the batch notification message;
identify, based on session establishment information provided to the NF for each of the affiliated sessions, the certain affiliated sessions as any affiliated session from among the plurality of affiliated sessions that have session establishment information indicating that the affiliated session is eligible for batch termination and corresponds to a PDU session supported by the part of the communication network that experienced the network event; and
terminate each of the certain affiliated sessions.

* * * * *